US007430834B2

(12) United States Patent
Degarie (10) Patent No.: US 7,430,834 B2
(45) Date of Patent: Oct. 7, 2008

(54) MEMBRANE-COVERED RESERVOIR HAVING A HATCHWAY THEREIN

(75) Inventor: Claude J. Degarie, Fredericton (CA)

(73) Assignee: Geomembrane Technologies Inc., Fredericton, New Brunswick (CA)

( * ) Notice: Subject to any disclaimer, the term of this patent is extended or adjusted under 35 U.S.C. 154(b) by 566 days.

(21) Appl. No.: 11/099,790

(22) Filed: Apr. 6, 2005

(65) Prior Publication Data
US 2005/0252093 A1 Nov. 17, 2005

Related U.S. Application Data

(60) Provisional application No. 60/559,420, filed on Apr. 6, 2004.

(51) Int. Cl.
E04H 7/02 (2006.01)

(52) U.S. Cl. .................. 52/169.7; 52/3; 52/63; 405/129.45; 405/129.5; 220/521

(58) Field of Classification Search ............... 52/169.7, 52/169.14, 63, 169.6, 169.1, 741.11, 741.12, 52/3; 405/129.45, 129.5, 129.6, 129.55, 405/129.75, 129.9, 52; 220/216, 521, 227; 588/249, 251; 4/506
See application file for complete search history.

(56) References Cited

U.S. PATENT DOCUMENTS

| 1,455,582 | A | 5/1923 | Ford |
| 2,625,314 | A | 1/1953 | Moyer |
| 3,103,083 | A | 9/1963 | Seeger |
| 3,313,443 | A | 4/1967 | Dial et al. |
| 3,683,427 | A | 8/1972 | Burkholz et al. |
| 3,815,367 | A | 6/1974 | Collins et al. |
| 3,980,199 | A | 9/1976 | Kays |
| 3,991,900 | A | 11/1976 | Burke et al. |
| 4,136,408 | A | 1/1979 | Dahlbeck et al. |
| 4,139,117 | A | 2/1979 | Dial |
| RE30,146 | E | 11/1979 | Dial et al. |
| 4,208,469 | A | 6/1980 | Dial |
| 4,230,580 | A | 10/1980 | Dodson |
| 4,438,863 | A | 3/1984 | Wilson et al. |
| 4,446,983 | A | 5/1984 | Gerber |

(Continued)

FOREIGN PATENT DOCUMENTS

CA 2154374 1/1997

(Continued)

*Primary Examiner*—Phi Dieu Tran A
(74) *Attorney, Agent, or Firm*—Mario Theriault (57) ABSTRACT

The membrane cover has fold lines therein intersecting the walls of the reservoir at intersection points. A geometric chord or secant joins two intersection points, and defines, with a portion of the walls of the reservoir, a static segment in the membrane cover. The membrane cover in the static segment is tensioned along lines of force that are parallel to or that make acute angles, with the aforesaid chord or secant. The membrane cover in the static segment remains substantially planar and stationary, thus static, despite the rising and lowering of the remaining portion of the cover in response to variations in the level of the content of the reservoir. A hatchway is mounted in the static segment of the cover. In another aspect of the invention, the hatchway has an airtight compartment extending between the membrane cover and a point below the level of the material inside the reservoir.

20 Claims, 4 Drawing Sheets

U.S. PATENT DOCUMENTS

| | | | |
|---|---|---|---|
| 4,476,992 A | 10/1984 | Gerber | |
| 4,503,988 A | 3/1985 | Gerber | |
| 4,603,790 A | 8/1986 | Gerber | |
| 4,606,083 A | 8/1986 | Kingston | |
| 4,672,691 A | 6/1987 | De Garie et al. | |
| 4,966,492 A * | 10/1990 | Poyda | 405/129.6 |
| 5,078,543 A | 1/1992 | Terrel | |
| 5,080,786 A | 1/1992 | DeLima | |
| 5,212,090 A | 5/1993 | Landine et al. | |
| 5,505,848 A | 4/1996 | Landine et al. | |
| 5,562,759 A | 10/1996 | Morgan et al. | |
| 5,570,974 A * | 11/1996 | Jax et al. | 405/129.5 |
| 5,587,080 A | 12/1996 | Landine et al. | |
| 5,890,840 A * | 4/1999 | Carter, Jr. | 405/129.55 |
| 6,324,792 B1 | 12/2001 | DeGarie | |
| 6,338,169 B1 | 1/2002 | DeGarie | |
| 6,357,964 B1 | 3/2002 | DeGarie | |
| 6,361,249 B1 | 3/2002 | Hodgkinson et al. | |
| 6,389,757 B1 | 5/2002 | DeGarie | |
| 6,451,206 B1 | 9/2002 | Charbonneau | |
| 6,497,533 B2 | 12/2002 | DeGarie | |
| 6,524,029 B2 | 2/2003 | Nobert et al. | |
| 6,558,548 B2 | 5/2003 | Svirklys et al. | |
| 6,612,079 B2 | 9/2003 | DeGarie et al. | |
| 2003/0066789 A1 | 4/2003 | Morgan et al. | |
| 2004/0016755 A1 | 1/2004 | Gilbert et al. | |

FOREIGN PATENT DOCUMENTS

| | | |
|---|---|---|
| GB | 2072649 | 10/1981 |
| WO | WO 2004/011348 | 2/2004 |

* cited by examiner

MEMBRANE-COVERED RESERVOIR HAVING A HATCHWAY THEREIN

FIELD OF THE INVENTION

This invention pertains to membrane-covered reservoirs and more particularly it pertains to a manure reservoir covered by a flexible floating membrane, and having a hatchway through the membrane, inside the perimeter of the reservoir.

BACKGROUND OF THE INVENTION

Livestock manure is an excellent biological fertilizer that has been used since the beginning of agriculture. Livestock manure has high value in maintaining and fertilizing a soil because of the plant nutrients, humus, and organic and fibrous substances contained in it. It is known that a high percentage of the nitrogen, phosphorus, and potassium fed to dairy cattle for example, are excreted in manure. These elements are basic nutrients that plants need for healthy growth.

The fertilizing properties of cattle, poultry and swine manure, however, are depending upon several factors. It has been found for example, that the fertilizing properties of manure depend on the conditions in which the manure is stored prior to spreading it on crop fields.

When the manure is exposed to air, a chemical process takes place and causes nitrogen to be released into the atmosphere under different forms. Before the manure can be spread on a field, the proper balance in the fertilizing elements must be restored by adding chemical nitrogen into the manure. This additional operation is costly. Therefore there is a first incentive for farmers to carefully store the manure in a reservoir that is airtight to some extent, to minimize loss of nutrients.

In another aspect, the accumulation of rainwater and melting snow inside an uncovered manure reservoir reduces the capacity of the reservoir and increases the handling and transport costs for spreading this diluted manure on a field. Therefore this is a second incentive for farmers to store the manure under an impermeable cover to prevent dilution with water.

It is believed that the preferred manure storage installation to prevent degradation of the fertilizing elements found in livestock manure and to prevent dilution of manure with rain water and melting snow, includes a concrete reservoir covered by a flexible impermeable membrane floating over the content of the reservoir. This type of cover reduces the air space at the surface of the reservoir, and has the ability to rise with the accumulation of material inside the reservoir. The preferred membrane cover is strong enough to support several workers walking on it. Any accumulation of water at the surface of such membrane can be pumped out using a portable sump pump, and any snow can be removed by shoveling or blowing it if required.

Another requirement to preserve the fertilizing properties of cattle manure during storage consists of periodically agitating the content of the manure reservoir with a portable pumping and mixing device to promote fermentation. In common practice, this agitation is rarely effected because of the odor that is generated from the reservoir.

Preferably, a manure reservoir has a hatchway within the perimeter thereof to insert a portable pumping and mixing device therein. This hatchway is preferably isolated from the bio-gas floating at the surface of the reservoir such that this bio-gas and associated odors do not escape into the environment or do not mix with outside air every time the hatch doors are opened.

Although the prior art contains numerous suggestions on floating membrane covers for installation over industrial, municipal and agricultural liquid reservoirs, these prior art installations do not provide for a hatchway therein for introducing a portable pumping and mixing device inside the reservoir. In that respect, the following documents represent a good inventory of a first type of membrane covers available in the prior art.

U.S. Pat. No. 3,103,083 issued to F. Seeger on Sep. 10, 1963;
U.S. Pat. No. 3,815,367 issued to J. B. Collins et al. on Jun. 11, 1974;
U.S. Pat. No. 3,980,199 issued to W. B. Kays on Sep. 14, 1976;
U.S. Pat. No. 3,991,900 issued to N. R. Burke et al. on Nov. 16, 1976;
U.S. Pat. No. 4,139,117 issued to H. S. Dial on Feb. 13, 1979;
U.S. Patent RE 30,146 reissued to H. S. Dial et al. on Nov. 13, 1979;
U.S. Pat. No. 4,230,580 issued to C. Dodson on Oct. 28, 1980;
U.S. Pat. No. 4,438,863 issued to J. V. Wilson et al. on Mar. 27, 1984;
U.S. Pat. No. 4,446,983 issued to D. H. Gerber on May 8, 1984;
U.S. Pat. No. 4,476,992 issued to D. H. Gerber on Oct. 16, 1984;
U.S. Pat. No. 4,503,988 issued to D. H. Gerber on Mar. 12, 1985;
U.S. Pat. No. 4,603,790 issued to D. H. Gerber on Aug. 5, 1986;
U.S. Pat. No. 4,672,691 issued to C. J. DeGarie et al. on Jun. 16, 1987;
U.S. Pat. No. 5,080,786 issued to D. De Lima on Jan. 14, 1992;
U.S. Pat. No. 5,212,090 issued to R. Landine et al. on May 18, 1993;
U.S. Pat. No. 5,505,848 issued to R. Landine et al. on Apr. 9, 1996;
U.S. Pat. No. 5,562,759 issued to W. D. Morgan et al. on Oct. 18, 1996;
U.S. Pat. No. 5,587,080 issued to R. Landine et al. on Dec. 24, 1996;
U.S. Pat. No. 6,338,169 issued to C. J. DeGarie on Jan. 15, 2002;
U.S. Pat. No. 6,357,964 issued to C. J. DeGarie on Mar. 19, 2002;
U.S. Pat. No. 6,451,206 issued to R. Charbonneau on Sep. 17, 2002;
U.S. Pat. No. 6,497,533 issued to C. J. DeGarie et al. on Dec. 24, 2002;
U.S. Pat. No. 6,524,029 issued to J. E. Nobert et al. on Feb. 25, 2003;
U.S. Pat. No. 6,558,548 issued to F. Svirklys et al. on May 6, 2003.

Other prior art documents disclose openable portions in a second type of membrane covers mounted over industrial, municipal or agricultural reservoirs. These documents are as follows:

U.S. Pat. No. 6,324,792 issued to C. J. DeGarie on Dec. 4, 2001;
U.S. Pat. No. 6,389,757 issued to C. J. DeGarie on May 21, 2002;
U.S. Pat. No. 6,612,079 issued to C. J. DeGarie on Sep. 2, 2003.

A third type of reservoir for storing livestock manure has an access well extending vertically alongside the reservoir. The well contains pipes and a nozzle by which a circulation can be created inside the reservoir to agitate the content of the reservoir. This installation is described in GB Patent Application 2,072,649, published by L. Mellen on Oct. 7, 1981.

A flexible floating membrane does not lend itself to the installation of a hatchway there through. A flexible floating membrane is subject to dynamic stresses from wind, snow and ice loads, and static stresses from its own weight. Therefore it is important that the perimeter of the membrane material be uniformly fastened along the wall of the reservoir.

It is believed that a hatchway structure within the perimeter of a reservoir has never been developed in the past because of the problems associated with the protruding features of a hatchway structure, and the stress concentration points in the membrane cover caused by such protrusions.

The existing flexible floating membrane covers of the first type mentioned above have at least one structural feature in common. The edges of the flexible membrane are uniformly supported along the walls of the reservoirs on which they are mounted. The perimeters of these reservoirs do not have any protruding feature thereon. The perimeter of such reservoir is smooth and has even anchor-bolt-spacing to retain the membrane cover uniformly.

The covers of the prior art reservoirs having openable portions comprise a roof structure supporting the membrane cover above the liquid level of the reservoir. In these installations, a substantial amount of bio-gas can accumulate between the surface of the material in the reservoir and the membrane cover. When the cover is opened, this bio-gas can escape outside the reservoir. Therefore this type of openable cover is not appropriate for minimizing the loss of nutrients from livestock manure stored inside the reservoir.

In the third type of prior art reservoir mentioned above, the vertical access well is located outside the manure reservoir. It is believed that this access well can only provide for an indirect access to the reservoir, and a conventional pumping and mixing device introduced therein can only achieve limited performance.

For all these reasons, it is believe that a need exists for a floating membrane cover that can be installed on existing open-top manure reservoirs and in which a hatchway and an airtight compartment can be mounted without exposing the flexible membrane to damaging concentrated stress.

SUMMARY OF THE INVENTION

In the present invention, however, there is provided a reservoir that is covered by an impermeable floating flexible membrane cover and through which is mounted a hatchway. A pumping and mixing device may be introduced inside the reservoir through the hatchway without having to partly remove the membrane cover. The hatchway has an airtight compartment to prevent the bio-gas and other fertilizing elements at the surface of the reservoir from escaping into the environment.

Broadly, the present invention comprises a circular reservoir having a material content therein, a circular vertical wall, and an impermeable membrane cover affixed to the upper edge of the vertical wall. The membrane cover has radial fold lines therein wherein each fold line intersects the vertical wall at a respective intersection point. A geometric chord or secant joins two intersection points, and defines, with a portion of the circular wall, a circular segment in the membrane cover. The membrane cover in the circular segment is tensioned along lines of force that are parallel to or that make acute angles, with the aforesaid chord or secant.

For convenience the geometric chord or secant is also referred to herein as the "chord", and the circular segment defined by the chord is also referred to as the "static segment".

The reservoir according to the present invention also has a hatchway mounted inside the reservoir through the membrane cover in the static segment of the cover.

In the present invention, the hatchway is located in a region where the membrane cover remains substantially planar and stationary, thus static, despite the rising and lowering of the remaining portion of the cover in response to variations in the level of the reservoir. Therefore, the dynamic stress in the membrane cover stress in the static segment and around the frame of the hatchway is substantially negligible.

In a second aspect of the present invention, there is provided reservoir having walls defining a closed space and a flexible membrane cover affixed to the upper edges of the walls and floating at a surface of the reservoir. A hatchway is mounted through the membrane cover and inside the perimeter of the reservoir. The hatchway has a horizontal portion, and a downward portion extending through the membrane cover. The horizontal portion has a hatch door therein and holed flanges for sealing the horizontal portion and the hatch door assembly against the membrane cover. The downward portion includes a skirt extending below a surface of the reservoir, and downward flanges bordering the skirt, for sealing the skirt against the wall of the reservoir.

Together, the skirt, the wall of the reservoir and the horizontal portion of the hatchway form an airtight compartment between the liquid level of the reservoir and the membrane cover. Even when one of the hatch doors is opened, the bio-gas inside the reservoir is trapped outside the skirt portion and is prevented from escaping into the environment. Periodically, the content of the reservoir can be agitated through the hatchway without removing a portion of the cover, and without allowing the ambient air from getting in contact with the bio-gases. When the content of the reservoir is livestock manure, the fertilizing elements in this manure are retained therein, and the dilution of the manure with rainwater or melting snow is prevented.

In another aspect of the present invention, the reservoir is not limited to circular shapes. The membrane cover and hatchway can be installed on elliptical reservoir as well as rectangular or polygonal reservoirs. Because of the holed flanges around the hatch doors and along the skirt portion of the hatchway, the hatchway and membrane cover comprised in the present invention can be easily installed as a retrofit installation in common manure reservoirs.

It will be appreciated that another advantage of this hatchway and airtight compartment consists of reducing the odor around the reservoir when the hatchway is opened. Furthermore, when the bio-gases are used as a source of energy in an auxiliary burner for example, the opening of the hatchway does no interrupt this production of energy.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

Three embodiments of the present invention are illustrated in the accompanying drawings, in which like numerals denote like parts throughout the several views, and in which.

DESCRIPTION OF THE PREFERRED EMBODIMENTS

While this invention is susceptible of embodiment in many different forms, there is shown in the drawings and will be described in details herein three specific embodiments, with the understanding that the present disclosure is to be considered as an example of the principles of the invention and is not intended to limit the invention to the embodiments illustrated and described.

Figure 1:
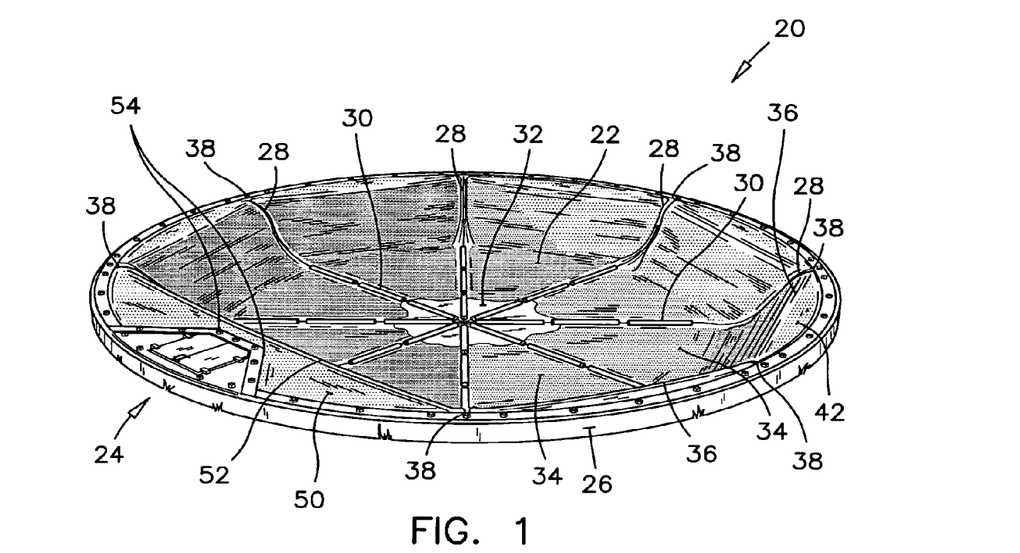
FIG. 1 is a perspective top and side view of a circular reservoir according to the first preferred embodiment of the present invention, having a membrane cover and a hatchway therein.
Figure 2:
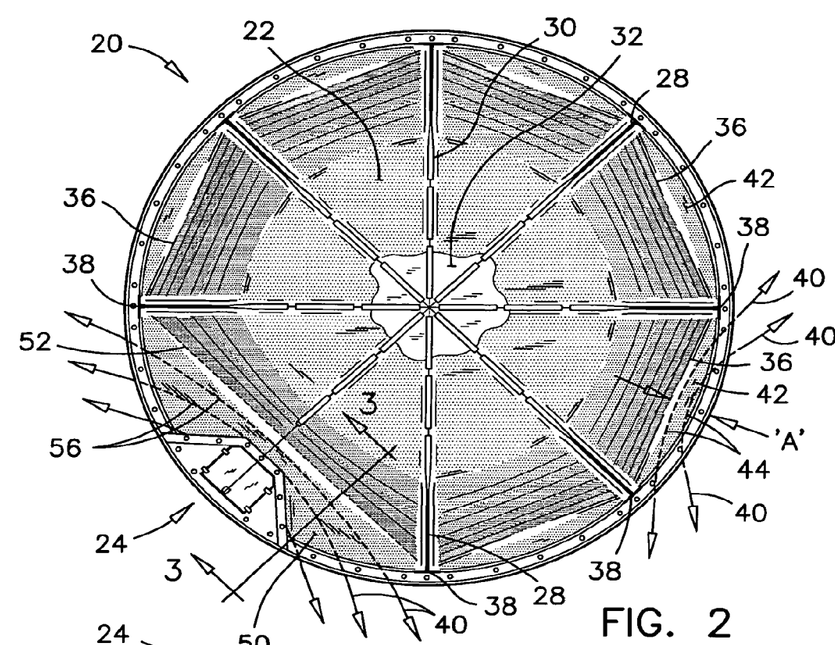
FIG. 2 is a plan view of the reservoir illustrated in FIG. 1.

Referring firstly to FIGS. 1 and 2, a circular manure reservoir 20 is illustrated therein. An impermeable membrane cover 22 having a hatchway 24 therein is mounted over this circular reservoir 20. The reservoir 20, the membrane cover 22 and the hatchway 24 are referred to as the reservoir according to the first preferred embodiment.

The membrane cover 22 is fastened to the upper edge of the circular wall 26 of the reservoir by any usual way, such as by anchor bolts and ring plates. The membrane cover 22 has sufficient material to lay flat over the bottom surface of the reservoir 20 when the reservoir is empty. The excess material at the circumference of the cover is gathered into folds along fold lines 28, at regular intervals around the reservoir. Weight lines 30 are attached to the walls 26 of the reservoir and extend along the fold lines 28 and into the folds to extend the folds downward and to gather excess material of the membrane into the folds when the level of the reservoir rises.

In use, rainwater 32 accumulates at the centre of the cover and can be pumped out using a portable sump pump for example. The weight lines 30 are advantageous for causing depressions in the reservoir cover to accumulate rainwater. The weight lines 30 also promote the migration of bio-gas to the perimeter of the reservoir and prevent the formation of gas bubble in the central portion of the membrane cover. Such gas bubble is known to catch the wind and cause the membrane cover to flap up and down. As a result, wind-induced fatigue stresses can eventually cause the membrane cover to tear or break.

In the reservoir according to the first preferred embodiment, the weight lines 30 and the fold lines 28 extend radially from the centre thereof and define sectors 34 in the cover. The membrane cover 22 also has tight chords 36 extending between the intersections of the fold lines 28 with the wall 26 of the reservoir. These intersection points are labeled as 38. The tight chords 36 are formed by pulling on the membrane cover 22 in opposite directions inside a same sector 34 of the membrane material, toward the intersection points 38 of the fold lines 28, substantially as illustrated by arrows 40 in FIG. 2, before fastening the membrane material in each sector 34 to the wall 26 of the reservoir.

Each chord 36 defines a static segment 42 in the membrane cover where the membrane material is substantially stationary relative to, and despite the variations in, the level of the reservoir 20.

While the installation of the membrane cover 22 has been explained graphically in FIG. 2, it may be better understood if one considers that the membrane cover in each static segment 42 is stretched along lines of forces 44 that are either parallel to of making acute angles with its bordering chord 36.

The chords 36 are advantageous for allowing the dynamic portion of membrane cover 22 to lay down evenly as a plurality of flat triangular sectors 34 each having a straight base along a respective chord 36 and an apex at the centre of the reservoir.

In the preferred membrane cover, a hatchway 24 is mounted through one of these static segments 42 between the corresponding chord 36 and the wall 26 of the reservoir, if the dimension 'A' of that segment 42 is sufficient.

The depth 'A' of each static segment 42 is proportional to the diameter of the reservoir and the number of fold lines 28 in the membrane. When the dimension of a single segment 42 is insufficient for accommodating a hatchway 24, a larger static segment 50 is formed by creating a longer chord 52 extending across the width of two adjacent sectors 34 for example between the intersection points 38 of the outside fold lines 28 of these sectors. A hatchway 24 is then installed in that larger segment 50 as illustrated in FIGS. 1 and 2.

The advantage of installing a hatchway 24 in a static segment 42 or 50 defined by a chord 36 or 52 is that the static segment remains substantially stationary. Consequently, there are only negligible stresses at the corners 54 of the hatchway 24 during the movement of the membrane cover 22 to follow the level of the material content inside the reservoir.

The larger segment 50 is also formed by stretching the membrane of that segment in opposite directions toward the intersection points 38 of the bordering fold lines 28, substantially as shown by lines of forces 56 in FIG. 2, before attaching the membrane to the wall 26 of the reservoir. It will be appreciated that the lines of force 56 in the segment 50 are also parallel to or making acute angles with the chord 52.

Figure 3:
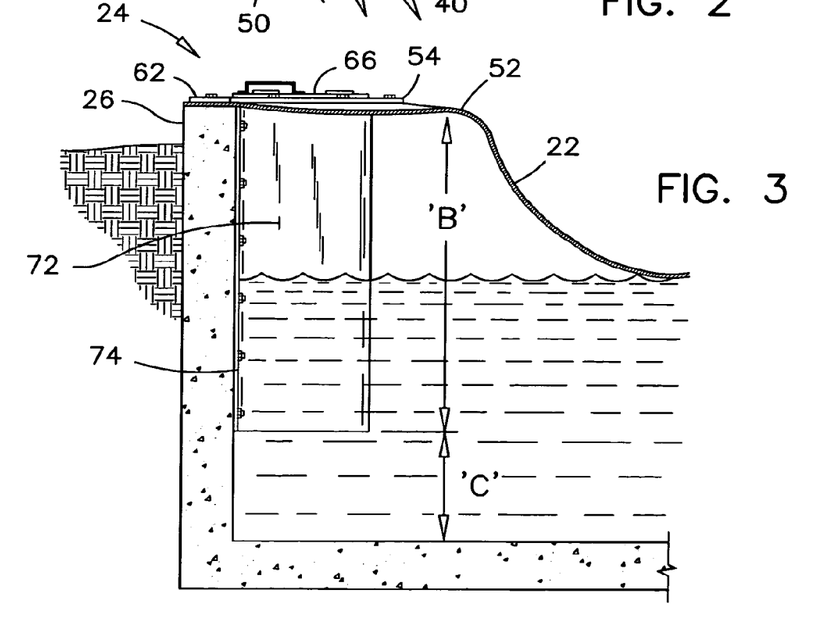
FIG. 3 is a cross-section view of the hatchway and the membrane cover in the reservoir according to the first preferred embodiment, as seen along line 3-3 in FIG. 2.
Figure 4:
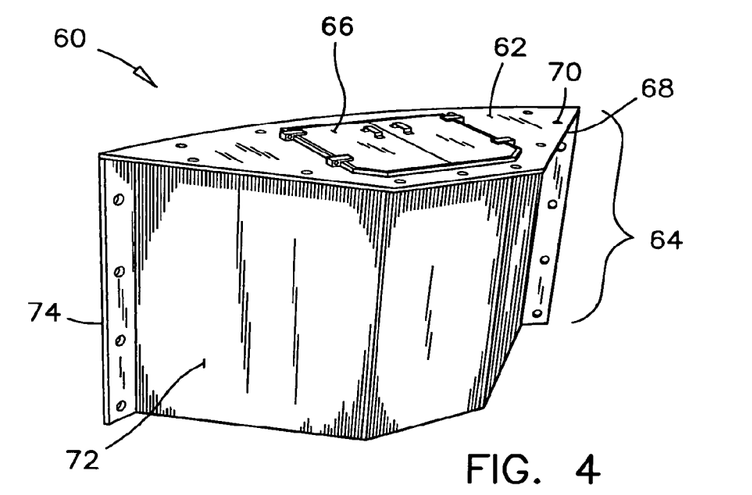
FIG. 4 is a perspective view of the hatch doors and airtight compartment in the hatchway illustrated in FIGS. 1 to 3.

Referring now to FIGS. 3 and 4, the structure of the hatchway 24 will be explained. The hatchway 24 consists of a rigid caisson 60 made of a horizontal portion 62 and a vertical portion 64. The horizontal portion 62 has hatch doors 66 therein and a horizontal flange 68 with holes 70 to which the membrane cover can be fastened and sealed. The vertical portion 64 of the caisson 60 has a skirt portion 72 extending downward from the bottom surface of the horizontal portion 62. The vertical portion 64 also has a pair of vertical holed flanges 74, one on each side of the skirt portion 72. The hatch doors 66 communicate with a space define by the skirt portion 72.

In use, the vertical flanges 74 are fastened and sealed against the inside wall 26 of the reservoir, by anchor bolts for example, as shown in FIG. 3, and the horizontal portion 62 is fastened and sealed to the upper edge of the vertical wall and to the membrane cover 22. The skirt portion 72 defines an airtight compartment between the level of the reservoir and the membrane cover 22.

Figure 7:
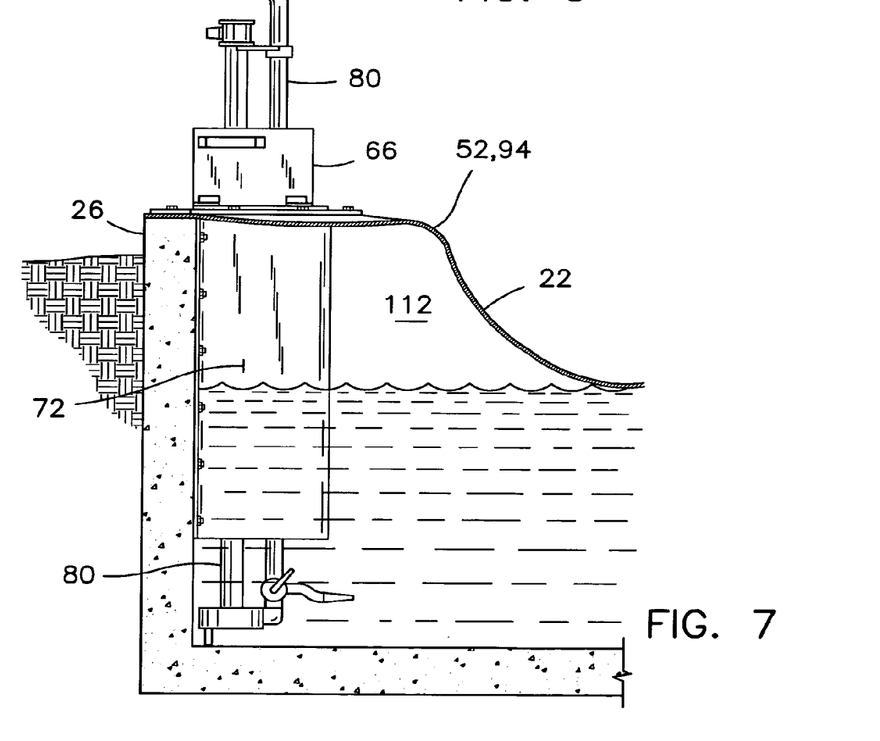
FIG. 7 is a cross-section through the hatchway mounted in a reservoir according to the first or the second preferred embodiment, in which is inserted a common pumping and mixing device.

The skirt portion 72 of the hatchway 24 extends down into the reservoir and below the level of the material content of the reservoir, to a distance 'B' which corresponds to the minimum level of the material content of the reservoir. Preferably the skirt portion 72 extends to a distance 'C' of about two feet from the bottom surface of the reservoir to allow for the introduction and operation of a pumping and mixing device 80 in the reservoir, as illustrated in FIG. 7.

Because the horizontal portion 62 of the hatchway 24 is sealed against the membrane cover 22 and the vertical portion 64 is sealed against the vertical wall, the hatch doors 66 can be opened without losing any of the bio-gas at the surface of the material content inside the reservoir.

The skirt portion 72 defines a spaced that is large enough to introduce a pumping and mixing device 80 inside the reservoir, and is also large enough to allow a diver to enter into the reservoir and to do repair work to the reservoir or to the membrane cover 22 for example.

In use, the weight line 30 extending from the hatchway 24 may be omitted. Also, the membrane cover 22 itself is preferably made of a light-coloured material in order to reduce the melting of snow on the cover. Snow loads on the cover are advantageous, as the weight lines 30, for preventing the formation of gas bubble under the cover, by forcing the bio-gas toward the perimeter of the cover.

The hatchway 60 is preferably made of galvanized steel, of other corrosion-resistant metal or reinforced plastic material.

Figure 5:
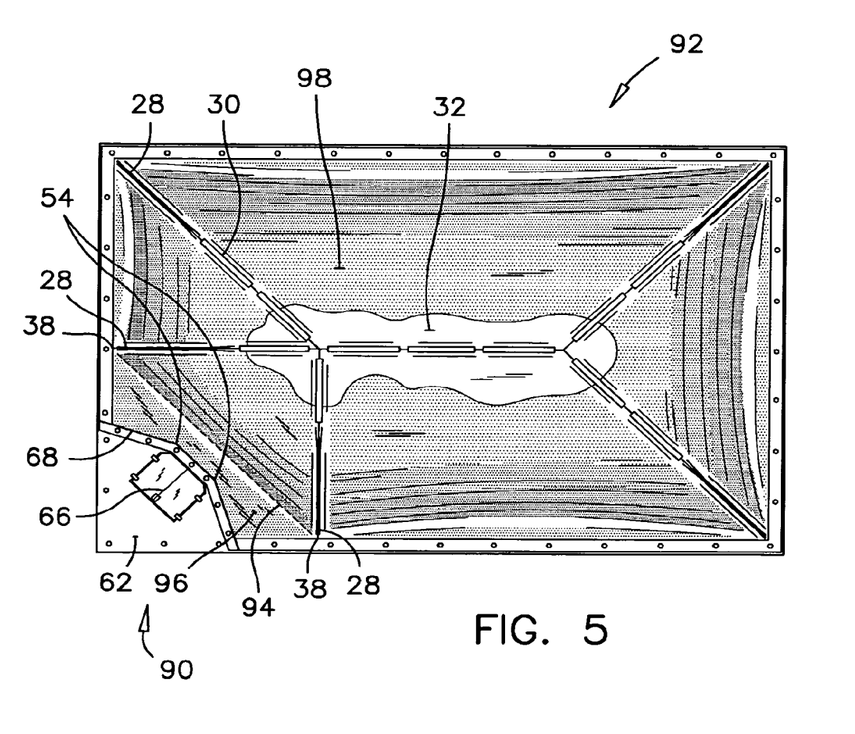
FIG. 5 is a plan view of a rectangular reservoir according to the second preferred embodiment of the present invention, having a membrane cover and a hatchway therein.

Referring now to FIG. 5, a hatchway 90 can also be installed in a rectangular reservoir 92 using substantially the same method as just described. In this installation, fold lines 28 are formed at appropriate locations, on perpendicular sides of the reservoir for example, to define a chord 94 and a triangular static segment 96 that has sufficient area to accommodate a hatchway 90 therein. As for the circular reservoir, the chord 94 in this second preferred embodiment of the present invention defines a substantially static segment 96 in the membrane cover 98 extending from the edge of the reservoir 92 and beyond the protruding corners 54 of the hatchway 90.

The structure of the hatchway 90 in this rectangular reservoir 92 has not been illustrated because it is similar to the hatchway in the circular reservoir 20, with slight variations to accommodate the rectangular walls of the reservoir. It is believed that these variations will be readily understood in the light of the information already provided herein, and that no further explanation is required.

Figure 6:
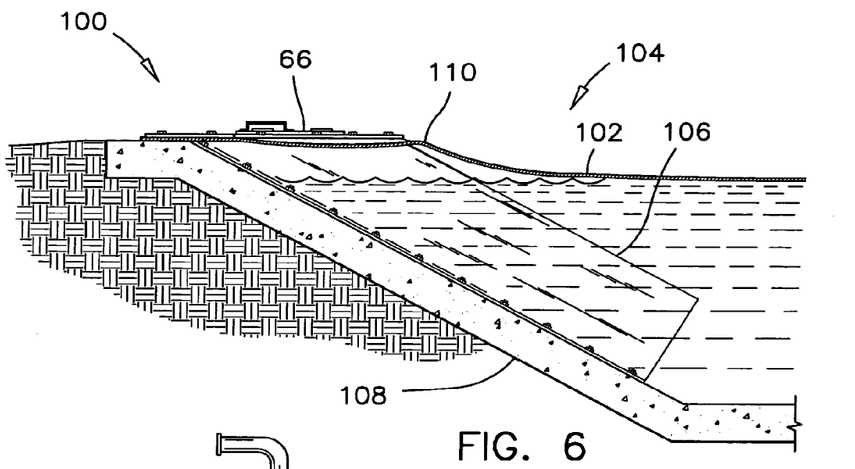
FIG. 6 is a cross-section view through a hatchway mounted through a membrane cover in a sloped-wall reservoir.

Although the hatchways 24, 90 and the membrane covers 22, 98 have been described in a circular and rectangular reservoirs 20, 92 having substantially vertical inside walls, it will be appreciated that the same invention can be applied to a sloped-wall reservoir for example as illustrated in FIG. 6, and to reservoirs having other closed shapes such as an elliptical or a polygonal shape.

In an installation of the hatchway 100 and membrane cover 102 over a sloped-wall reservoir 104, the caisson 106 of the hatchway 100 is fastened and sealed against the sloped wall 108 of the reservoir. The caisson 106 of the hatchway 100 also extends below the minimum level of the material inside the reservoir such that the bio-gas trapped at the surface of the reservoir cannot escape into the atmosphere when the hatch doors 66 are opened. The hatchway 100 is also installed between the outside edge of the reservoir 104 and a chord 110 formed in the membrane cover 102.

The hatchways 24, 90 and 100 have similar caisson dimensions and correspondingly large hatch doors 66 to accommodate the introduction of a pumping and mixing device 80 inside the reservoir, as illustrated in FIG. 7. The bio-gas rising at the surface of the reservoir is trapped into the void spaces 112 along the perimeter of the reservoir. Because of the caissons 60, 106 in the hatchways 24, 90, and 100, the bio-gas trapped under the membrane cover cannot escape outside the reservoir when the hatch doors are opened. This bio-gas is kept there to prevent further evaporation of nitrogen from the manure inside the reservoir. It will be appreciated that the bio-gases trapped under the cover can also be recovered and used in other advantageous applications.

As to other manner of usage and operation of the present invention, the same should be apparent from the above description and accompanying drawings, and accordingly further discussion relative to the manner of usage and operation of the invention would be considered repetitious and is not provided.

While three embodiments of the present invention have been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

What is claimed is:

1. A reservoir having a material content, a circular vertical wall and a membrane cover affixed to an upper edge of said vertical wall;

said membrane cover having radial fold lines therein wherein each of said fold lines intersects said vertical wall at an intersection point, and a chord joining two of said intersection points; said chord and a portion of said circular wall defining a circular static segment in said membrane cover; said membrane cover in said circular static segment being tensioned along lines of force extending parallel to or making acute angles with, said chord; such that said membrane cover in said circular static segment remains substantially stationary relative to said membrane cover outside said circular static segment when a level of said material content in said reservoir varies, and a hatchway mounted inside said reservoir through said membrane cover in said circular static segment.

2. The reservoir as claimed in claim 1, wherein said hatchway has a skirt portion sealed against said membrane cover and said vertical wall and forming an airtight compartment between said material content and said membrane cover.

3. The reservoir as claimed in claim 2, wherein said hatchway has a horizontal portion, a hatch door in said horizontal portion and means for sealing said membrane cover thereto around said hatch door.

4. The reservoir as claimed in claim 3, wherein said means for sealing said membrane is a holed flange in said horizontal portion.

5. The reservoir as claimed in claim 3, wherein said hatchway has a vertical portion, and said vertical portion has two holed flanges bordering said skirt; said holes flanges being affixed to said vertical wall for sealing said skirt portion against said vertical wall.

6. The reservoir as claimed in claim 2, wherein said skirt portion extends from said membrane cover and into said material content and to a depth of about two feet from a bottom surface of said reservoir.

7. The reservoir as claimed in claim 1 wherein said membrane cover is an impermeable flexible membrane floating at a surface of said material content in said reservoir.

8. The reservoir as claimed in claim 1, wherein said fold lines define a plurality of symmetrical sectors in said reservoir and said chord extends across two juxtaposed sectors.

9. The reservoir as claimed in claim 7, wherein said material content in said reservoir is livestock manure.

10. The reservoir as claimed in claim 7, wherein said membrane cover is light-coloured.

11. A reservoir having walls defining a closed space, and a flexible impermeable membrane cover affixed to upper edges of said walls and floating at a surface of a material content in said reservoir;

said membrane cover having fold lines therein wherein each of said fold lines intersects one of said walls at a respective intersection point; and a chord joining two of said intersection points; said chord defining with a portion of one of said wall a static segment in said membrane cover; said membrane cover in said static segment being tensioned along lines of force extending parallel to or making acute angles with, said chord, such that said membrane cover in said static segment remains substantially stationary relative to said membrane cover outside said static segment when a level of said material content in said reservoir varies; and a hatchway mounted inside said reservoir through said membrane cover in said static segment.

12. The reservoir as claimed in claim 11, wherein said closed space is rectangular and said material content is livestock manure.

13. The reservoir as claimed in claim 12, wherein said hatchway is mounted in a corner of said reservoir.

14. A reservoir having walls defining a closed space containing a material content, and an impermeable flexible membrane cover affixed to upper edges of said walls and floating at a surface of said material content in said reservoir; and a hatchway mounted inside said reservoir; said hatchway having a horizontal portion, and a downward portion extending through said membrane cover; said horizontal portion having a hatch door therein and means for sealing said hatch door against said membrane cover; and said downward portion including a skirt extending below a surface of said content in said reservoir, and means for sealing said skirt against said wall and against said horizontal portion.

15. The reservoir as claimed in claim 14, wherein said walls are vertical walls and said downward portion is oriented vertically.

16. The reservoir as claimed in claim 14, wherein said material content in said reservoir has a minimum level, and said skirt extends below said minimum level.

17. The reservoir as claimed in claim 14, wherein said skirt extends from said membrane cover to a depth of about two feet from a bottom surface of said reservoir.

18. The reservoir as claimed in claim 15 wherein said membrane cover has fold lines therein wherein each fold line intersects one of said walls at a respective intersection point; and said membrane cover further has a chord joining two of said intersection points; said chord defining a static segment in said membrane cover; said membrane cover in said static segment being tensioned along lines of force extending parallel to or making acute angles with, said chord, such that said membrane cover in said static segment remains substantially stationary relative to said membrane cover outside said static segment when a level of said material content in said reservoir varies.

19. The reservoir as claimed in claim 18, wherein said hatchway is mounted in said static segment.

20. The hatchway as claimed in claim 18, further comprising weight lines extending over said fold lines.

* * * * *